United States Patent
Van Der Horst et al.

(10) Patent No.: US 11,611,737 B2
(45) Date of Patent: Mar. 21, 2023

(54) SYSTEM FOR ILLUMINATING A VIEWER OF A DISPLAY DEVICE

(71) Applicant: ZHANGJIAGANG KANGDE XIN OPTRONICS MATERIAL CO. LTD, Zhangjiagang (CN)

(72) Inventors: Jan Van Der Horst, Veldhoven (NL); Jurjen Caarls, Veldhoven (NL); Pieter Wilhelmus Theodorus De Jong, Veldhoven (NL); Bob Frans Böggemann, Veldhoven (NL)

(73) Assignee: ZHANGJIAGANG KANGDE XIN OPTRONICS MATERIAL CO. LTD, Jiangsu (CN)

( * ) Notice: Subject to any disclaimer, the term of this patent is extended or adjusted under 35 U.S.C. 154(b) by 0 days.

(21) Appl. No.: 17/419,723

(22) PCT Filed: Dec. 31, 2019

(86) PCT No.: PCT/CN2019/130441
§ 371 (c)(1),
(2) Date: Jun. 30, 2021

(87) PCT Pub. No.: WO2020/140891
PCT Pub. Date: Jul. 9, 2020

(65) Prior Publication Data
US 2022/0086420 A1    Mar. 17, 2022

(30) Foreign Application Priority Data

Dec. 31, 2018 (NL) ..................... 2022329

(51) Int. Cl.
*H04N 13/32* (2018.01)
*H04N 13/368* (2018.01)
*H04N 13/383* (2018.01)
*H04N 13/398* (2018.01)
*G06V 40/10* (2022.01)

(52) U.S. Cl.
CPC ............ *H04N 13/32* (2018.05); *G06V 40/10* (2022.01); *H04N 13/368* (2018.05); *H04N 13/383* (2018.05); *H04N 13/398* (2018.05)

(58) Field of Classification Search
USPC ........................................... 348/51
See application file for complete search history.

(56) References Cited

U.S. PATENT DOCUMENTS

| | | | |
|---|---|---|---|
| 9,436,870 B1* | 9/2016 | Mangiat | G06F 3/005 |
| 2003/0012425 A1* | 1/2003 | Suzuki | G02B 27/0093 |
| | | | 348/E13.05 |
| 2003/0025995 A1* | 2/2003 | Redert | H04N 13/368 |
| | | | 348/E13.043 |
| 2014/0118511 A1* | 5/2014 | Hyde | H04N 13/366 |
| | | | 348/54 |
| 2014/0306879 A1 | 10/2014 | Oka et al. | |
| 2015/0015681 A1 | 1/2015 | Kim et al. | |
| 2016/0274659 A1* | 9/2016 | Caraffi | H04N 5/232411 |
| 2017/0212359 A1* | 7/2017 | Kim | H04N 13/351 |
| 2020/0336723 A1* | 10/2020 | De Jong | H04N 13/31 |

FOREIGN PATENT DOCUMENTS

WO    2011001372 A    1/2011

OTHER PUBLICATIONS

Fehn C et al: "Interactive 3-DTV—Concepts and Key Technologies"; Proceedings of the IEEE, IEEE. New York US. Mar. 3, 2006.

* cited by examiner

*Primary Examiner* — Behrooz M Senfi
(74) *Attorney, Agent, or Firm* — Gang Yu

(57) ABSTRACT

Provided is a display device comprising a display panel having an array of display pixel elements for producing a display output; a viewer detecting system rendering data representing 1) the illumination intensity of a body part of the viewer and 2) another property of the body part; at least one illumination source for providing illumination of a body part of the viewer; and a processor configured to 1) process the data representing the illumination intensity of a body part of the viewer and 2) drive the at least one illumination source dependent on said illumination data to adapt the illumination intensity of a body part of the viewer.

19 Claims, No Drawings

SYSTEM FOR ILLUMINATING A VIEWER OF A DISPLAY DEVICE

CROSS-REFERENCE TO RELATED APPLICATION

The present application is a National Stage of International Patent Application No: PCT/CN2019/130441 filed on Dec. 31, 2019, which claims the benefit of priority to Netherlands Patent Application No. 2022329, filed on Dec. 31, 2018, the content of which is hereby incorporated by reference in its entirety.

TECHNICAL FIELD

The invention relates to a display device, to a method for improving viewer detection, to a computer readable medium and to software arranged for performing the method.

BACKGROUND

Autostereoscopic displays have attracted great attention in the last two decades. Such displays usually comprise an imaging arrangement provided over a pixel array, wherein the imaging arrangement is designed to direct the output from different pixels to different spatial positions in front of the display, e.g. by means of a lenticular lens stack, directional backlight, or a parallax barrier. This allows the emittance of images specifically intended for the left eye (a left eye view) and images specifically intended for the right-eye (a right eye view), which allows a viewer to perceive a stereoscopic image.

For a good 3D quality, it is important that a left eye view does not also reach the right eye (and vice versa), which is a phenomenon that is known as crosstalk. One way of reducing crosstalk is to take the position of the eyes of a viewer into account when driving the pixel array, so that the light output can truly be directed to only one specific eye. This is usually performed by means of a camera that is interfaced with face-tracking software to thereby render real-time data on the position of the eyes. A proper eye tracking is however hampered when a face is only partly illuminated, for instance by sunlight. It is even more difficult to accommodate for variations in the illumination conditions over time.

The necessity of a proper tracking of body parts is however not limited to the autostereoscopic systems as described above. It will also be of value for e.g. display systems wherein emotions of viewers have to be recognized, or for certain games wherein players (viewers) need to be identified and/or their gestures need to recognized (such as movement of arms, hands, fingers).

SUMMARY

It is therefore an objective of the invention to provide a display device wherein accurate face tracking (in particular eye tracking) is possible under conditions wherein there is a light contrast on a face, and/or under conditions wherein the intensity of illumination of a face is not constant over time.

It has now been found that one or more of these objectives can be reached by applying a particular viewer tracking system.

MODE FOR THE INVENTION

Accordingly, the present invention relates to a display device comprising a display panel having an array of display pixel elements for producing a display output;
a viewer detecting system rendering data representing 1) the illumination intensity of a body part of the viewer and 2) another property of the body part;
at least one illumination source for providing illumination of a body part of the viewer;
a first processor configured to
process the data representing the illumination intensity of a body part of the viewer; and
drive the at least one illumination source dependent on said illumination data to adapt the illumination intensity of a body part of the viewer.

The viewer detecting system renders data of a body part of a viewer. These data represent at least the illumination intensity of the body part and another property of the body part. Such other property may be the position of the body part relative to the display panel, the display device, or to another body part (such as the position of the eyes), it may be an expression of the body part (such as the facial expression), it may be the shape of the body part (such as the shape of an ear or nose), it may be a condition of the body part (such as the pupil size) and it may be a gesture that is made by the body part (such as a particular move by e.g. a hand, foot or finger). The property may also concern a plurality of characteristics of the body part that together form a fingerprint of the body part, such as the relative dimensions and/or positions of a nose, ear, eye, etc., to thereby allow recognition of the body part, such as face recognition.

When the position of eyes is rendered, this may concern the position of each eye, or the position of the center point between two eyes.

The viewer detecting system typically comprises means for measuring light intensity, such as a sensor capable of detecting light, in particular infrared light. In particular, it comprises at least one camera capable of recording images of a body part of a viewer who is present in the field of view of the display device.

The viewer detecting system is capable of detecting at least one viewer. It may also be capable of detecting a plurality of viewers, such as two viewers, three viewers and four viewers.

The illumination of a body part may in principle concern any body part, such as a leg, a foot, an arm, a hand, a finger, and the head of a viewer. A body part may also concern a part of such body parts, for example a side of a face or head. This may be the case when the display device is designed such that the viewer detection system renders data on the illumination of two sides of a head or a face, and that it notices a difference in the illumination of either side of the head or face (i.e. a contrast) in case one side of the head or face is illuminated by an external light source such as the sun (and the other side is not). The illumination source may then reduce the contrast by illuminating the other side (i.e. the darker side) of the head or face.

The illumination source(s) is/are typically positioned adjacent to the display device, preferably at one or more edges of the display panel (or display device). They are positioned in such manner that they provide a useful illumination of a viewer who is at a suitable viewing distance of the display device.

A display device of the invention comprises at least one illumination source. Preferably, however, it comprises a plurality of illumination sources. For example, the device comprises two opposing illumination sources at opposing ends of the display, which can be driven independently of each other. It is also possible that more than two illumination sources are provided, such as three, four, five, six, seven, eight, nine or ten illumination sources. Usually, the illumination sources have mirrored positions with respect to a viewer who is centered in front of the display. For example, the display device is of a rectangular shape and comprises four illumination sources that can be driven independently of each other, wherein two illumination sources are placed on either side of the viewer (e.g. each illumination source is positioned at a corner of the display).

In case a display device of the invention comprises a camera and/or a light sensor, then it is preferred that the camera and/or the light sensor is/are integrated with the illumination source, so that the recording and/or detecting, respectively, occurs from a similar angle, in particular from angles that deviate less than 10°.

The illumination source may in principle be capable of emitting any type of electromagnetic radiation to provide the illumination. Preferably, however, the illumination occurs with a type of light that is selected from the group of UV-light, visible light and infrared light. More preferably, the illumination source is configured to illuminate infrared light and/or near-infrared light.

The function of the first processor of the display device is to use the illumination data to determine whether or not an adaptation in the illumination intensity of a body part of the viewer is to be made, and to actuate the at least one illumination source. To this end, the processor may determine periodically whether a change in the illumination intensity is necessary by e.g. comparing a measured contrast to a predefined threshold value. If an adaptation is necessary, then it drives the at least one illumination source to realize such adaptation. A criterion for an adaptation may also be that the absolute illumination intensity of a body part is too low (e.g. a head or face is too weakly illuminated) for rendering useful data on the other property of the body part (such as the position of the eyes of the viewer).

In a preferred embodiment, the display device of the invention is an autostereoscopic display device. Such device comprises an imaging arrangement which is provided over the display panel and which is designed to direct the output from different display pixel elements to different spatial positions within a field of view of the display device, such that at least two viewing areas are defined to which at least two different images can be displayed simultaneously. In such device, the other property of the viewer's body part that is rendered is the position of the viewer's eyes relative to the display panel (or display device). This position is then used to drive the pixels of the display panel, so that a left eye view and a right eye view can exactly and real-time be directed to the specific eye.

To this end, a second processor is present, which is configured to process the data representing the position of the eyes of the viewer relative to the display panel. The spatial direction that is required for the display of each view is calculated on the basis of the position data and the characteristics of the imaging arrangement, and the pixels under the imaging arrangement are actuated in accordance therewith. To this end, the autostereoscopic display device typically also comprises an image source for providing image content (i.e. the contents of each view). The processor uses the image content provided by the image source. Thus, the processor drives the display panel dependent on said position data to simultaneously display the at least two different images to the at least two viewing areas.

In the case of an autostereoscopic display device, the imaging arrangement typically comprises an element selected from the group of a lenticular lens, a parallax barrier and directional backlight.

The invention further relates to a method for improving viewer detection, wherein a body part of the viewer is within a field of view of a display device, the method comprising
  rendering data representing 1) the illumination intensity of the body part of the viewer and 2) another property of the body part; then
  processing the data representing the illumination intensity of the body part of the viewer; and then
  driving an illumination source for providing illumination of a body part of the viewer dependent on said illumination data to adapt the illumination intensity of the body part of the viewer.

The method of the invention may in particular be related to eye-tracking for an autostereoscopic display device. To this end, the method may further comprise
  rendering data representing 1) the illumination intensity of the head of the viewer and 2) the position of the eyes of the viewer relative to the display panel (i.e. the body part is the head and the other property of the head is the position of the eyes); then
  processing the data representing the position of the eyes of the viewer relative to the display panel; and then
  driving the display panel dependent on said position data to simultaneously display at least two different images to at least two viewing areas.

The invention further relates to a computer readable medium comprising transitory or non-transitory data representing instructions to cause a processor system to perform the above method of the invention.

The invention further relates to software arranged to perform the above method of the invention, when executed on a computer.

What is claimed is:

1. A display device comprising:
  a display panel having an array of display pixel elements for producing a display output;
  a viewer detecting system rendering data representing 1) the illumination intensity of two sides of a head or a face of the viewer and 2) the position of the head or the face;
  at least one illumination source for providing illumination of one side of the head or the face of the viewer;
  a first processor configured to
    process the data representing the illumination intensity of the two sides of the head or the face of the viewer; and
    when there is a contrast in the illumination intensity of the two sides of the head or the face, drive the at least one illumination source dependent on said illumination data to reduce the contrast by illuminating one side of the head or the face of the viewer;
    wherein the device comprises two opposing illumination sources at opposing ends of the display, which can be driven independently of each other.

2. The display device according to claim 1, wherein the device is of a rectangular shape and comprises four illumination sources that can be driven independently of each other, wherein two illumination sources are placed on the display device, and the two illumination sources have mirrored positions with respect to the viewer.

3. The display device according to claim 1, wherein the viewer detecting system comprises at least one camera capable of recording images of two sides of the head or the face of the viewer who is present in the field of view of the display device.

4. The display device according to claim 3, wherein the viewer detecting system comprises at least one sensor capable of detecting light, in particular infrared light.

5. The display device according to claim 4, wherein the at least, one camera and/or the at least one light sensor is integrated with the illumination source, so that the recording and/or detecting, respectively, occurs from a similar angle, in particular from angles that deviate less than 10°.

6. The display device according to claim 1, wherein the illumination source is configured to illuminate infrared light and/or near-infrared light.

7. The display device according to claim 1, wherein the viewer detecting system is capable of detecting a plurality of viewers.

8. The display device according to claim 1, the display device being an autostereoscopic display device wherein
the viewer detecting system renders data representing 1) the illumination intensity of two sides of the head of a viewer and 2) the position of the eyes of the viewer relative to the display panel;
the display device comprises an imaging arrangement which is provided over the display panel and which is designed to direct the output from different display pixel elements to different spatial positions within a field of view of the display device, such that at least two viewing areas are defined to which at least two different images can be displayed simultaneously;
the first processor configured to process the illumination intensity, data representing the illumination intensity of the two sides of the head of the viewer; and when there is a contrast in the illumination intensity of the two sides of the head, drive the at least one illumination source dependent on said illumination data to reduce the contrast by illuminating one side of the head or the face of the viewer;
the display device comprises a second processor configured to
process the data representing the position of the eyes of the viewer relative to the display panel; and
drive the display panel dependent on said position data to simultaneously display the at least two different images to the at least two viewing areas.

9. The display device according to claim 8, wherein the imaging arrangement comprises an element selected from the group of a lenticular lens, a parallax barrier and directional backlight.

10. A method for improving viewer detection, wherein two sides of the head or the face of the viewer is within a field of view of the display device according to claim 1, the method comprising
rendering data representing 1) the illumination intensity of the two sides of the head or the face of the viewer and 2) the position of the head or the face; then
processing the data representing the illumination intensity of the two sides of the head or the face of the viewer; and then
when there is a contrast in the illumination intensity of the two sides of the head or the face, driving at least one of the illumination source for providing illumination of the other side of the head or the face of the viewer dependent on said illumination data to educe the contrast.

11. The method according to claim 10, wherein the method is preceded by detecting the number of viewers.

12. The method according to claim 10, wherein the display device is an autostereoscopic display device, the method comprising
rendering data representing 1) the illumination intensity of the two sides of the head of the viewer and 2) the position of the eyes of the viewer relative to the autostereoscopic display device;
processing the data representing the illumination intensity of the two sides of the head of the viewer;
and when there is, a contrast in the illumination intensity of the two sides of the head, driving at least one of the illumination source for providing illumination of one side of the head of the viewer dependent on said illumination data to reduce the contrast;
processing the data representing the position of the eyes of the viewer relative to the device;
driving the display panel dependent on said eye position data to simultaneously display at least two different images to at least two viewing areas of the autostereoscopic display device.

13. A computer readable medium comprising non-transitory data representing instructions to cause a processor system to perform the method according to claim 10.

14. An electronic device comprising a memory and a processor, wherein a computer program is stored in the memory, and the processor is set to run the computer program so as to execute method of claim 10.

15. The computer readable medium according to claim 13, wherein the method is preceded by detecting the number of viewers.

16. The computer readable medium according to claim 13, wherein the display device is an autostereoscopic display device, the method comprising
rendering data representing 1) the illumination intensity of the two sides of the head of the viewer and 2) the position of the eyes of the viewer relative to the autostereoscopic display device;
processing the data representing the illumination intensity of the two sides of the head of the viewer;
and when there is a contrast in the illumination intensity of the two sides of the head, driving at least one of the illumination source for providing illumination of one side of the head of the viewer dependent on said illumination data to reduce the contrast;
processing the data representing the position of the eyes of the viewer relative to the device;
driving the display panel dependent on said eye position data to simultaneously display at least two different images to at least two viewing areas of the autostereoscopic display device.

17. The electronic device according to claim 14, wherein the method is preceded by detecting the number of viewers.

18. The electronic device according to claim 14, wherein the display device is an autostereoscopic display device, the method comprising
rendering data representing 1) the illumination intensity of the two sides of the head of the viewer and 2) the position of the eyes of the viewer relative to the autostereoscopic display device;
processing the data representing the illumination intensity of the two sides of the head of the viewer;
and when there is a contrast in the illumination intensity of the two sides of the head, driving at least one of the illumination source for providing illumination of one side of the head of the viewer dependent on said illumination data to reduce the contrast;

processing the data representing the position of the eyes of the viewer relative to the device;

driving the display panel dependent on said eye position data to simultaneously display at least two different images to at least two viewing areas of the autostereoscopic display device.

19. The method according to claim 11, wherein the display device is an autostereoscopic display device, the method comprising rendering data representing 1) the illumination intensity of the two sides of the head of the viewer and 2) the position of the eyes of the viewer relative to the autostereoscopic display device;

processing the data representing the illumination intensity of the two sides of the head of the viewer;

and when there is a contrast in the illumination intensity of the two sides of the head, driving at least one of the illumination source for providing illumination of one side of the head of the viewer dependent on said illumination data to reduce the contrast;

processing the data representing the position of the eyes of the viewer relative to the device;

driving the display panel dependent on said eye position data to simultaneously display at least two different images to at least two viewing areas of the autostereoscopic display device.

* * * * *